Figure 14:
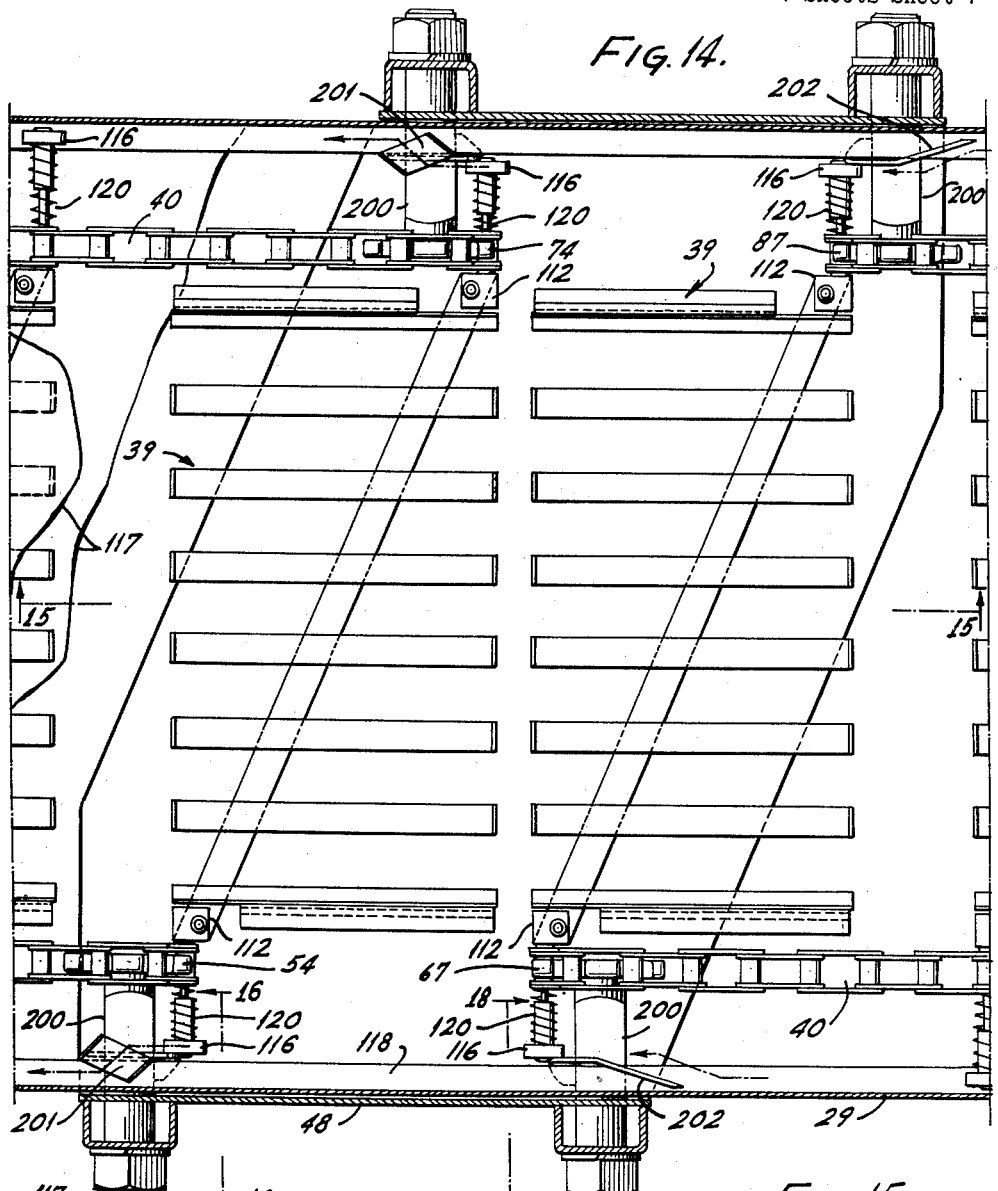

April 19, 1960 B. K. MANSSON 2,933,176
CONVEYOR APPARATUS
Filed Feb. 15, 1956 7 Sheets-Sheet 1
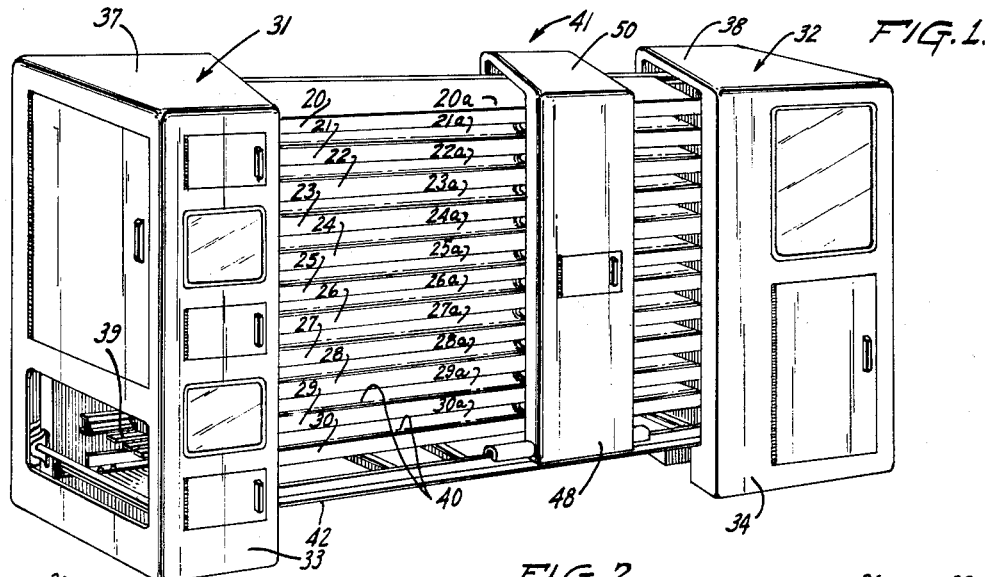
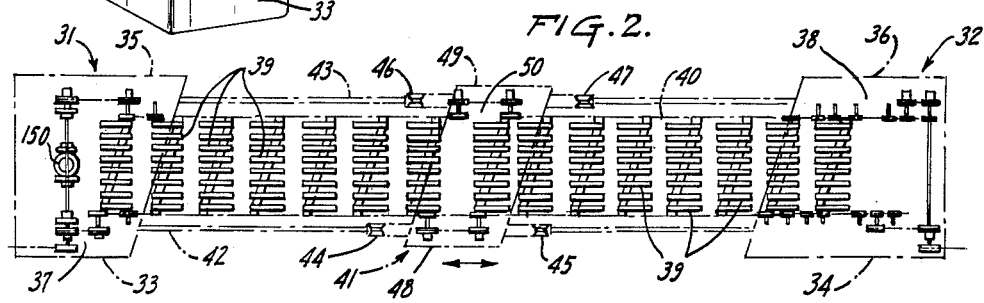
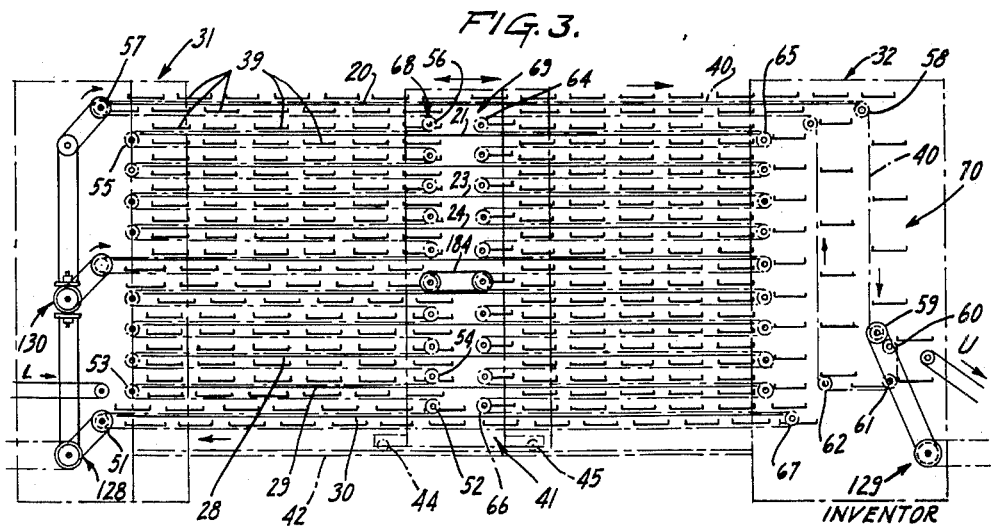
INVENTOR
BERTIL K. MANSSON
BY Carl H. Symnestvedt
AGENT

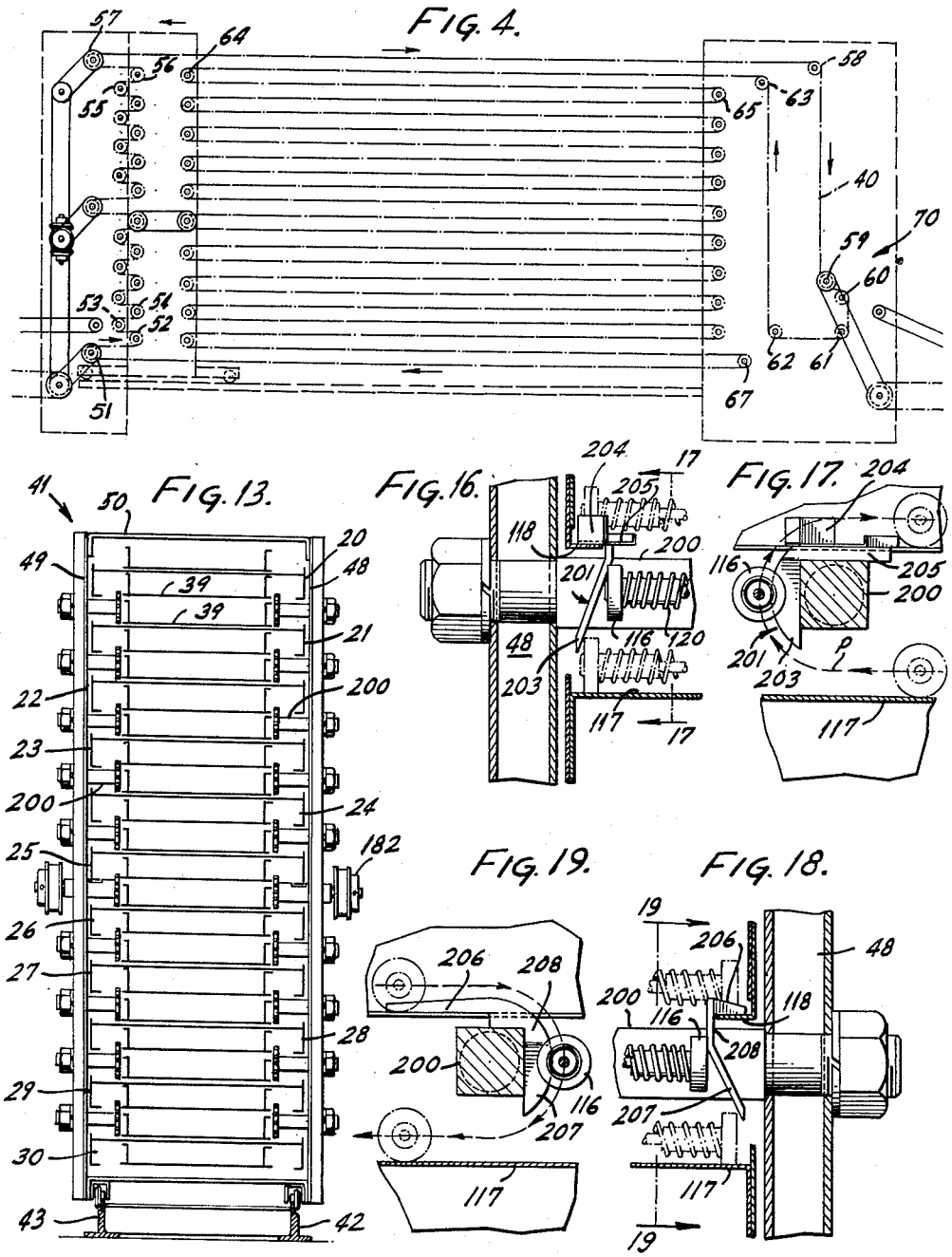

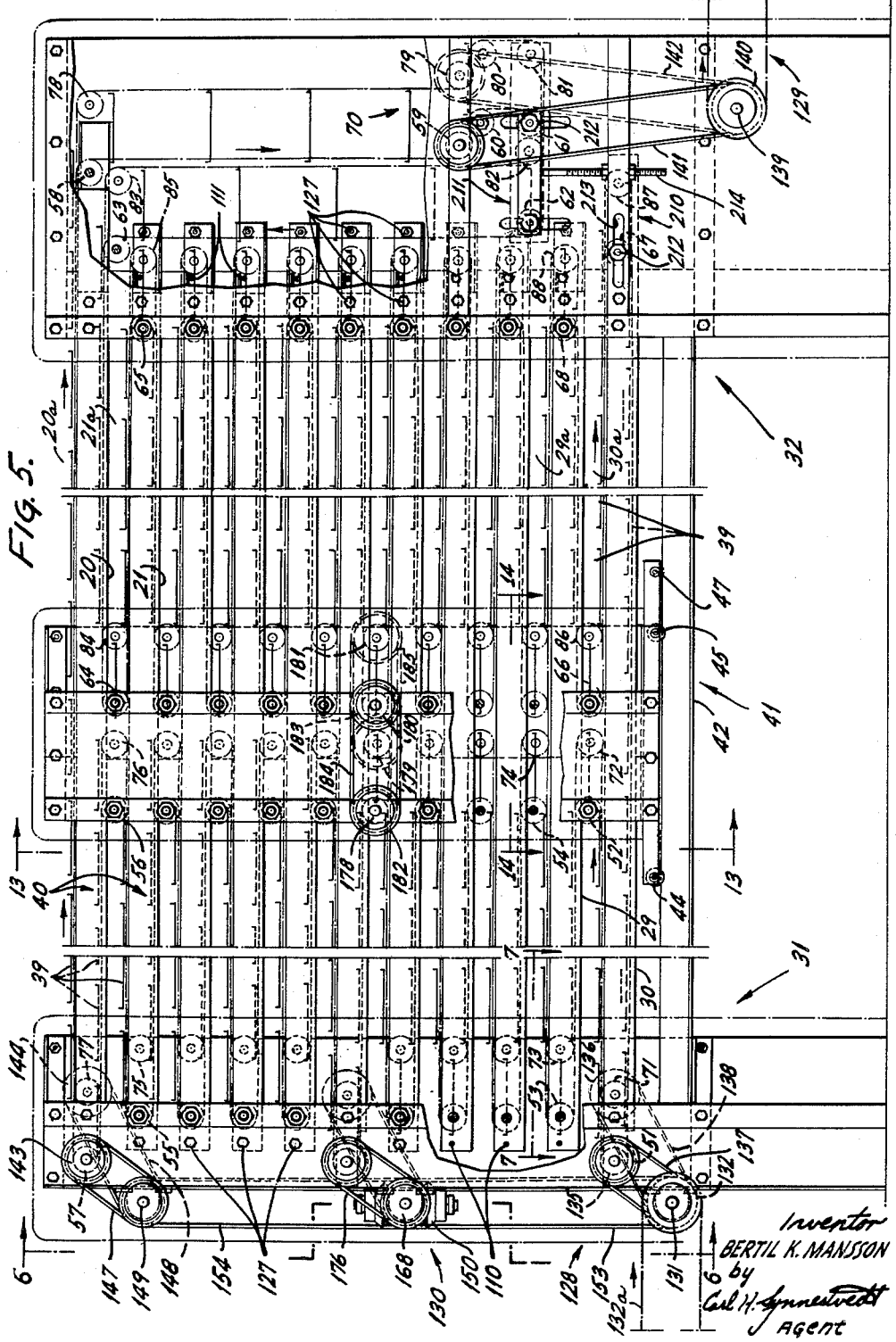

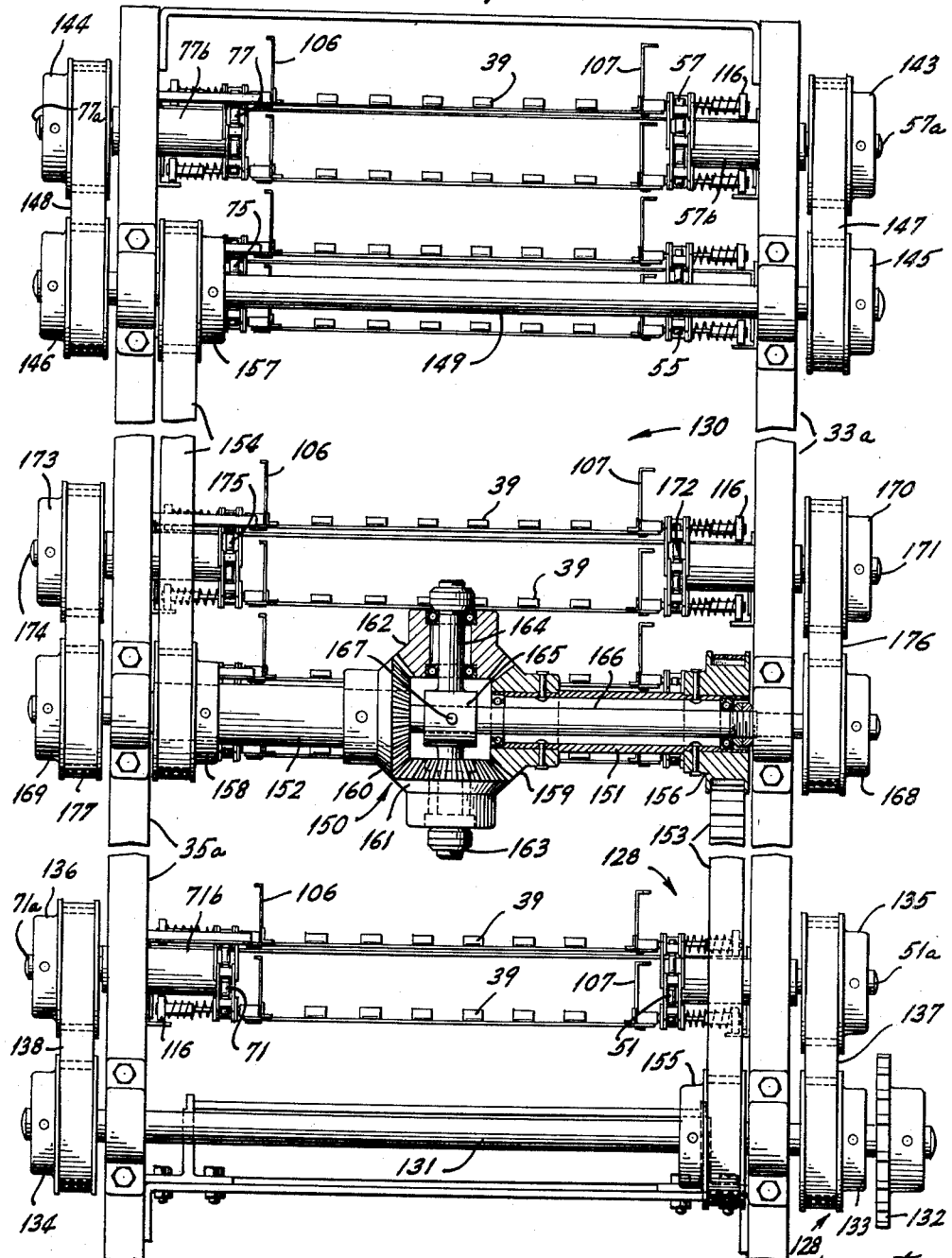

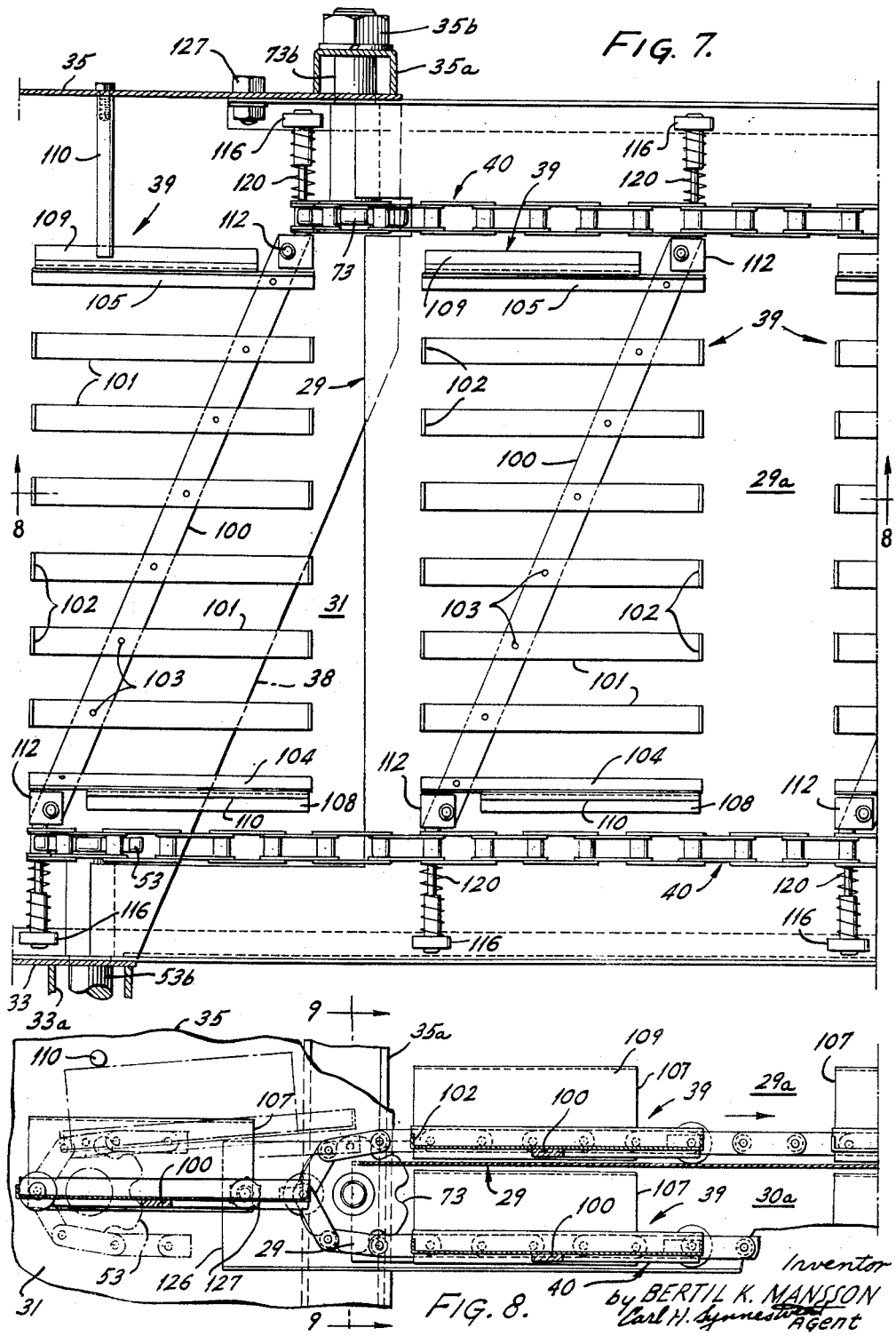

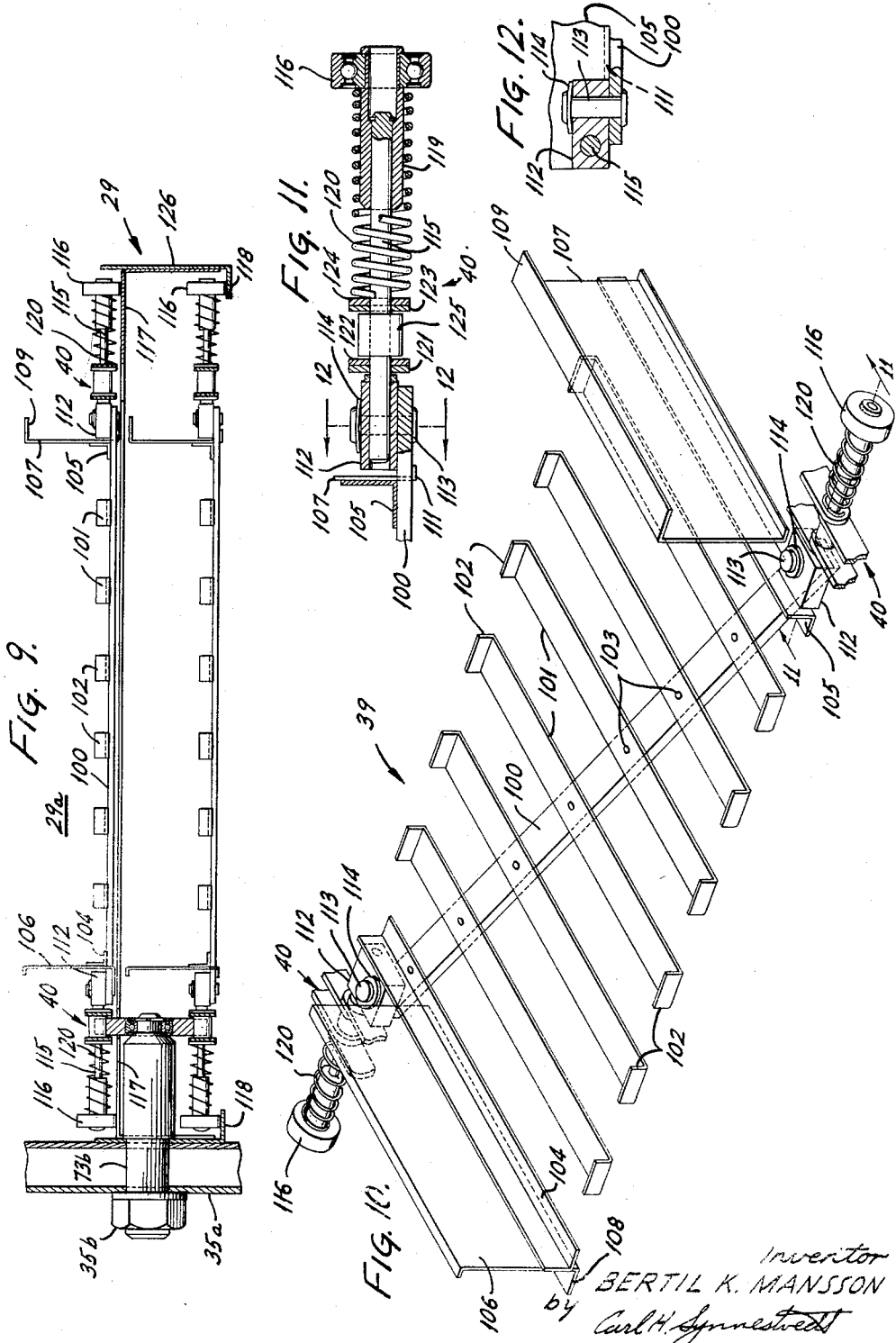

April 19, 1960     B. K. MANSSON     2,933,176
CONVEYOR APPARATUS
Filed Feb. 15, 1956     7 Sheets-Sheet 7

Inventor
BERTIL K. MANSSON
by Carl H. Lynnestedt
Agent

United States Patent Office 2,933,176
Patented Apr. 19, 1960

2,933,176

CONVEYOR APPARATUS

Bertil K. Mansson, Philadelphia, Pa., assignor to Philco Corporation, Philadelphia, Pa., a corporation of Pennsylvania Application February 15, 1956, Serial No. 565,590

7 Claims. (Cl. 198—139)

This invention relates to combined storage and conveyor apparatus, mainly for use in the mass production of complex articles, for instance in the mass fabrication of electrical circuit panels for television receivers.

Instrument panels and other elements or modules of this type are complex in more than one sense. In the first place, each element or module requires a great number of specially selected components, which must be "printed," inserted, soldered, tested and/or otherwise treated, in specific and critical relationships to one another, by a series of fabricating machines or of groups of fabricating machines. Such elements or modules are also completx in the further sense that their design and the characteristics of many of their components are subject to frequent changes. It becomes necessary even in the early stages of more or less experimental use to produce receiver circuit panels and the like in great numbers; and it remains necessary even in later stages of their mass fabrication to make occasional changes in their designs and in the production methods for the same. However, adjustments of this kind, applied to a mass production plan, tend to lead to difficulties, at least of a temporary kind, in some of the successive machines and thereby to interfere with the maintenance of a required, smoothly flowing or uninterrupted stream of semifinished products, flowing from initial fabricating operations, or groups thereof, to successive fabricating operations or groups thereof. Every machine unit geared to high-speed work on large masses of articles has many independent problems, requires frequent independent adjustments, and is therefore exposed to the possibility of sudden shut-downs, slow-downs and other operating changes. These changes, even when applied only briefly, tend to either choke or starve the channels of module transfer between successive fabrication units; and such a condition, in turn, is likely, at times, to cause losses of partly fabricated modules or at least repeated, cumulative losses of productive time.

It is an object of this invention to maintain smoothly flowing streams of circuit panels, or other mass produced articles, in said channels of transfer between machines, for example between circuit printing, component inserting, soldering, testing and other fabricating units, or, in other words, to miimize said losses of productive time and possible losses of partly fabricated goods.

For these purposes the invention provides what may briefly be called a combined mass conveying, transient mass-differential compensating apparatus. More particularly, the preferred apparatus comprises an integral article conveyor and storage unit, in series with and substantially convertible into a conveyor return and conveyor storage unit, independently driven loading and unloading stations being positioned in spatial correlation with predetermied points of these units. The independent loading and unloading stations can operate with separately adjustable and variable speeds; and one such station may continue to operate while the other is at a brief standstill. The resulting temporary or transient discrepancies between loading and unloading operations, performed in this machine, cause progressive conversion of module storage capacity into conveyor storage capacity, or vice versa; and such discrepancies are thereby prevented from causing interference with fabricating machines preceding or following the conveyor.

According to a broader aspect of the invention, adjustable conveyor and/or storage means are provided which can be used in a variety of systems, with either fabrication machines or any other units aligned therewith at one end or at both ends. Still more broadly, the invention provides a combination of two or more expandable and collapsible conveyor-storage sections, capable of inter-related adjustments for differently apportioning their total capacity to active and standby storage; advantageously with corresponding adjustments of loading and unloading operations applied to the different sections. Heretofore, standby storage and the like was usually treated as a fairly unimportant matter. The occasional employment of standby storage tended to introduce only small irregularities into a normal sequence of operations, and such irregularities were nearly always disregarded. However, there are a variety of cases wherein articles are conveyed from one point to another, or between more complex systems of points, and wherein it is important to connect standby storage space to the conveying line or lines, and to disconnect such space therefrom, without disturbance of parallel or related operations.

It is a feature and object of the invention that it insures smooth control of different units of storage capacity, in storage or conveyor systems; in other words, it minimizes disturbances of the type mentioned.

In this connection the invention comprises, as principal parts of the preferred apparatus, two or more longitudinally spaced, independently driven, interdependently expandable sections of an endless conveyor, each advantageously zig-zagging through a series of superposed tiers. In addition the invention includes, as a more particular part, at least one conveyor-wheel supporting carriage, straddling the conveyor and movable along the same. It may also include at least one differential drive for the conveyor.

In many cases, such as the transfer of unfinished circuit panels, the apparatus may desirably include means for keeping carriers or trays of such a conveyor in predetermined, for instance horizontal, positions, regardless of the various turns of the conveyor incident to its travel. A particular feature of such a horizontal tray conveyor consists in the use of an oblique tray support member, together with related or auxiliary features of the conveyor support system, to be described hereinafter. A specific improvement provides novel guide means for the trays and tray support members. It is an object of the invention by these and other elements to improve conveyors for mass-differential storage and for other purposes.

The details will now be explained and described, as incorporated in a preferred form of apparatus. In this description, and in the claims appended hereto, reference will be made to conveyor "chain" and "sprocket" systems, mainly for moving module carriers or trays, and also to "belt" and "pulley" systems, mainly for moving said sprockets. In a broad sense, these respective terms are equivalent and interchangeable with one another. The terms mentioned will be used in such a sense, as will be the correlated terms "flexible endless element" and "wheel."

In the drawing:

Figure 1 is a general perspective view of a machine incorporating the present invention. Figure 2 is a plan view of the same machine, with stationary parts and enclosure parts indicated only by schematic phantom lines in order to disclose movable parts. Figure 3 is a side view of said movable parts, again indicating stationary and enclosure parts only by schematic phantom lines; Figure 4 is a view generally similar to Figure 3 but showing only part of the movable equipment and showing such equipment in a position different from that of Figure 3; and Figure 5 is another view generally similar to Figure 3, on a larger scale, also showing stationary and enclosure parts, partly broken away. Figure 6, on a still larger scale, is a vertical end view of the left-hand or loading and control end of the machine, this view being taken substantially along the line 6—6 in Figure 5 and being partly in vertical section.

Figure 7 is a sectional plan view, on the scale of Figure 6, showing several trays and adjacent portions of the machine, adjacent said loading end, the section being taken along line 7—7 in Figure 5. Figure 8 is a fragmentary section through such trays, taken along line 8—8 in Figure 7; it also shows the position of certain parts by schematic phantom lines to indicate their cooperation with parts visible in the sectional view. Figure 9 is a section through a tray and adjacent parts, taken along line 9—9 in Figure 8. Figure 10 is a perspective view of a tray. Figure 11 is a detail section, taken along line 11—11 in Figure 10 and further enlarged to approximately actual size of the preferred embodiment; and Figure 12 is a similarly enlarged, further detail section, taken along line 12—12 in Figure 11.

Figure 15:
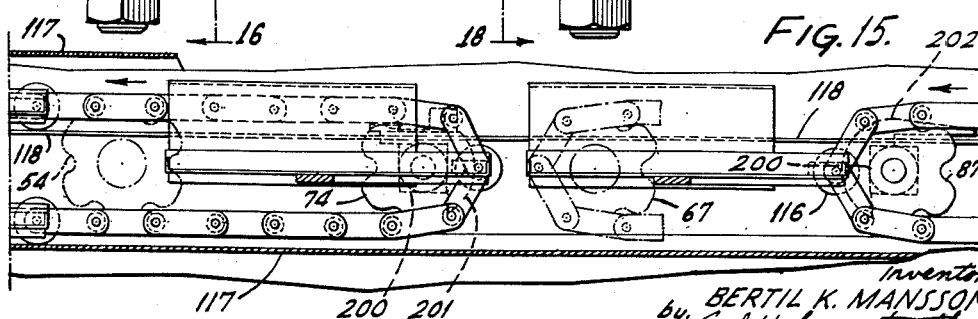

Figure 13 is a vertical, sectional view on the scale of Figure 5, showing mainly a sprocket block or traversing member, forming part of the machine, the view being taken along line 13—13 in Figure 5. Figure 14 is a sectional plan view, generally similar to Figure 7 and on the scale thereof but showing trays and cooperating parts in said traversing member of the machine, the view being taken along line 14—14 in Figure 5. Figure 15 is a fragmentary section through said traversing member and adjacent parts, the section being taken along line 15—15 in Figure 14. Figure 16, enlarged on the scale of Figures 11 and 12, is a sectional detail view, taken along line 16—16 in Figure 14. Figures 17, 18 and 19, similarly enlarged, are respectively a further section, taken along line 17 in Figure 16; another sectional detail view, taken along line 18—18 in Figure 14; and still another section, taken along line 19—19 in Figure 18.

It will be seen that Figures 1 to 6 show the preferred machine in general; Figures 7 to 12 show details of one loading or unloading station and of the conveyor trays; and Figures 13 to 19 show details in the sprocket support carriage.

Referring now to Figures 1 and 2: the machine comprises a system of rigid, horizontal, parallel track beams, disposed above one another, eleven such beams being shown at 20, 21, 22, 23, 24, 25, 26, 27, 28, 29 and 30. The space above each track beam will be called a conveyor and storage tier 20a, 21a, 22a, 23a, 24a, 25a, 26a, 27a, 28a, 29a, and 30a. Each track beam extends from a loading track beam mount 31 to an unloading track beam mount 32.

The mounts 31, 32 also form parts of conveyor terminal casings, with loading and unloading stations therein. Said casings are formed by vertical, rectangular front walls 33, 34 and back walls 35, 36 of the mounts 31, 32. Each casing has a horizontal four-sided top 37 with two sides parallel to the track beams and with an inner horizontally oblique side, facing the opposite mount. Further, each casing has, as best shown in Figure 7, a similarly shaped bottom 38. Similarly oblique members, all parallel with one another, form the principal parts of conveyor trays 39; and a series of such trays is interconnected by a pair of parallel, endless chains 40 to form, in effect a unitary, endless chain of trays, also referred to as a flexible conveyor for circuit panels.

The conveyor 40 extends in endless zigzag courses over cooperating groups of conveyor engaging and guiding sprockets; groups of such sprockets being mounted in the stationary loading and unloading mounts 31, 32, and in a movable carriage or sprocket block 41. This latter block straddles the conveyor 40 and is horizontally movable along the track beams between the loading and unloading mounts 31, 32. It serves as a shiftable partition between an active storage section or circuit panel storage section and an inactive or standby storage section or conveyor storage section; said sections being located, respectively, adjacent the loading and unloading mounts. The block or carriage 41 can be shifted back and forth on a pair of horizontal rails 42, 43, installed on and between the mounts 31, 32, below the set of track beams; there being a pair of front wheels 44, 45 and a pair of rear wheels 46, 47, all journalled to the sprocket block and rolling on said rails. The sprocket block has front, rear and top casing members, shown at 48, 49 and 50; the top 50 having two oblique sides, parallel to one another and to the oblique side of each of the casings 31, 32.

The basic arrangement of sprockets can best be described by reference to Figures 3 and 4. A first station-mounted or stationary loading sprocket 51 is pivoted in the front wall 33 of the loading mount, for rotation in a plane parallel to said wall, at a short distance therefrom, between the front and rear walls. All other sprockets are disposed in similar planes, adjacent front or rear walls of the three different casings (see Figure 3). They include a first horizontally shiftable or movable loading sprocket 52, forming part of the shiftable or movable sprocket block; and a series of additional loading sprockets, some of which are numbered 53, 54, 55, 56 and 57; the odd-numbered sprockets being stationary and the even-numbered ones, movable with the sprocket block. Similarly there is used a series of unloading sprockets, some of which are numbered 58 to 67. Successive loading sprockets are mounted at successive, mutually superposed levels, alternately in the loading casing 31 and in a loading portion 68 of the block 41; each stationary sprocket being positioned between a pair of tiers 21a, 22a, etc. (see Figure 1) and each movable sprocket being positioned within one of these tiers and horizontally movable between the track beams. Similarly Figure 3 shows how an unloading portion 69 of the block cooperates with the unloading casing 32. Thus there is formed a vertically staggered arrangement of stationary and movable sprockets. Chain sections are held substantially horizontally between successive sprockets, as best shown in Figure 4.

An auxiliary portion of the sprocket and chain system and particularly of the unloading section is shown in form of a stationary system 70 of delivery sprockets. It starts with the uppermost, stationary sprocket 58, receiving the chain 40 from the uppermost, stationary loading sprocket 57, and continues with a lower pair of offset stationary sprockets 59, 60 which may be obliquely superposed above one another as shown, and a still lower pair of horizontally aligned, stationary return sprockets 61, 62. From the last-mentioned sprocket 62 the chain leads to a sprocket system 63 to 67, which may be similar to the system of loading sprockets 51 to 57, except that it forms part of the unloading and unloaded, conveyor storage or standby storage means. From the last stationary sprocket 67 of the unloading system, the chain returns horizontally, through or across the block 41, to the first stationary sprocket 51 of the loading system.

As a result of these arrangements, substantially all sprockets 51, 52, 53, etc. can and do run at different velocities $V_{51}$, $V_{52}$, $V_{53}$, etc., if and as the sprocket block 41 moves between the track beam mounts, to the right or left of the position shown in Figure 3. The simultaneous use of such different velocities is allowed by the present machine, although an endless chain or equivalent flexible conveyor element 40 may interconnect all sprockets and may be held substantially taut between them.

It will readily be understood from the description given up to here that the linear velocity of horizontal shifting of the block equals $(V_{51}-V_{59})/n$, when $n$ is the number of speed differential compensating conveyor turns, between the terminal sprockets 51, 59, which run at a maximum difference of revolving velocities $V_{51}$, $V_{59}$. The sprocket rotation, if any, always has such directions as to cause circuit panels or other goods to be conveyed from the loading point 51 to the delivery point 60.

The aforementioned, horizontally oblique casing boundaries, associated with similarly oriented tray members, are suggested by phantom lines in Figures 2 and 3; and a feature connected with this arrangement is shown in Figures 5 and 6. By reference to these latter figures, it will be noted that all of the sprockets 51 to 67, mentioned up to now, are mounted in one vertical plane adjacent the front walls 33, 34, 48. A second, substantially identical set of sprockets 71 to 87 are similarly mounted in a vertical plane adjacent the rear walls 35, 36, 49; this second set of sprockets being horizontally displaced relative to the first, toward the unloading mount, by a distance corresponding with the horizontal obliqueness of tray members and casing contours. (See Figures 2 and 5.)

Because of this mutually offset arrangement of otherwise identical pairs of sprockets 51—71, 52—72, etc., the two sprockets of each of said pairs are journalled on individual axles 51a, 71a, 52a, 72a, 53a, 73a, etc., as shown in Figures 6 and 7. These axles cantilever into the casings 31, etc. and are held by individual bearing sleeves 51b, etc., which in turn may be secured in place by suitable structural members 33a, 35a, etc. and bolts 33b, 35b, etc. Thus no shafts extend from front walls 34, 35, 48 to rear walls 35, 36, 49, thereby allowing the use of horizontal, non-reversing conveyor trays 39, as shown in Figures 3 and 5. The details of such trays and their control will now be described.

Referring to Figures 7 to 12, each of the trays 39 is shown as having a body substantially formed by a horizontally oblique, elongated bar 100, which may be made from a metal such as steel or aluminum. Spaced, parallel strips or fingers 101 may be made of similar material, oriented in the direction of travel of the trays, provided with upturned ends or tips 102 and secured to the oblique bar 100, for instance by spot welds 103, in such manner that each complete set of fingers forms a rectangular skeleton tray and that the oblique bar 100 forms one diagonal thereof. All oblique bars 100 are parallel with one another and with the aforementioned, oblique boundary lines of casings, which in turn reflect a corresponding oblique or offset arrangement of each cooperating pair of sprockets, such as the pairs 51—71, 52—72, etc. By means of these arrangements each tray 39, either loaded or unloaded, can be held and moved in horizontal, upwardly facing position, with the tips 102 always pointing upwardly; and without overturning of the trays as they move about their end sprockets. This can be achieved by suspending the tray at only two points, that is, at the ends of the diagonal bar or equivalent element 100.

The parallel and non-overturning positioning of the trays facilitates the storage of goods in the apparatus; this applies mainly where the goods are handled in horizontal positions and without special jig, holder or pallet means in the preceding and following fabrication machines. In addition, this tray positioning allows a very simple, economical and efficient design of the traverser or sprocket block 41, as will be explained hereinafter.

The preferred, illustrated skeleton construction of the trays facilitates the picking up of circuit panels and other goods from a suitable supply station, the details of which are not shown, and similarly facilitates the delivery of the goods in a receiving station. In Figure 3, loading and unloading belts of such stations are indicated by conventional symbols; the actual constructions of these may of course be changed in many ways.

As best shown in Figures 7 to 10, each outer end portion of each tray bar 100 is associated with a relatively rigid, terminal finger and tilt control strip 104, 105, secured to said end portion; and these terminal strips have vertically upstanding flange support members 106, 107 attached thereto. One of the flange support members of each bar or tray, 106, has a broad, horizontal, outwardly extending flange 108 at the bottom thereof; whereas the other, 107, has a similar broad, horizontal, outwardly extending flange 109 at the top thereof. These flanges 108, 109 cooperate with stationary deflector bars 110, 111 (Figures 5, 7, 8), inwardly extending from the walls of the casing 31, 32, to apply certain tilting motions to the tilt strips 104, 105 and thereby to the tray bars 100, in the normal operation of the apparatus, to be explained hereinafter.

In addition, each end of a bar 100 has a connector block 112 attached thereto. Such blocks are shown in Figures 9 and 12 as being pivoted to the bar by vertical rivets 113 with the aid of spring washers 114. Further, each block 112 has a horizontal track wheel pin 115 slidably inserted therein, at right angles to the chain 40; and each pin 115 has a track wheel 116 secured to its outer end. The wheels 116 run on horizontal surfaces, formed on the various track beams; for instance, on track beam 29 illustrated in Figure 9. Said horizontal surfaces are provided by an upper, broad track strip 117 and a lower, narrow track strip 118, each forming part of one rigid track beam and extending from one mount 31 to the other mount 32. The upper and broad track members 117 project inwardly at least to a substantial extent, as best shown in the lower left hand part of Figure 7, in order to provide substantial rigidity of the track beam structure even within the end casings 31, 32, while leaving inner portions of these casings free and unobstructed for vertical travel of trays. (As mentioned above and best shown in the right hand portions of Figures 7 and 8, those portions of the upper track members 117 which extend between the amounts of 31, 32 may actually be consolidated between the front and rear, so as to form stationary trays, covering the entire area in question. However, in large machines according to this invention, separate track beam elements 117 may extend not only into the end casings, as shown, but all the way from one mount to the other.)

As shown in Figure 11, each track wheel 116 supports the corresponding pin 115 by a hub 119, which is loaded outwardly by a compression spring 120, the end of the spring bearing against one of the four chain link elements 121 to 124 which together with conventional spacer rings 125 form a pair of links of the chain 40. Thus there is formed a support system for each tray 39 and the contents thereof which system uses, as best shown in Figure 9, the connector blocks 112, pins 115, wheels 116, tracks 117, 118, and interconnecting vertical web members 126 forming part of each track beam. The track beams in turn, as shown in Figures 5, 7 and 8, may be secured to the walls 33, 34, 35, etc. of the mount members by fastening bolts 127. The total weight of circuit panels or other goods which from time to time may be present in the conveyor and storage system is ultimately absorbed by the mount elements 31, 32 at the two ends of the system. No significant weight of trays and tray-supported goods is carried by the individual sprockets, which only serve to actuate the conveyor chain in its successive horizontal and turning movements. Nor is any significant weight of trays or tray-supported goods carried by the sprocket block 41 and the support rails 42, 43 thereof; this block only carries its set of chain-guiding sprockets, by sprocket supports reaching in between the track beams, as best shown in Figure 13. Being free of significant weight load, the sprocket block can be moved back and forth on its rails without much friction, for the purposes initially explained.

The power for moving the sprocket block is basically obtained by differences of running speeds between a loading drive 128 and an unloading drive 129, actuating the conveyor 40 in the loading and unloading mounts 31, 32, respectively (Figures 3 and 5). In the machine illustrated in Figure 3 such speed differences are advantageously utilized for positive actuation of intermediate sprockets, at proper, intermediate velocities, by a differential drive 130. This avoids the danger, otherwise existing, that the block may become unstable by any application of relatively high driving effort and speed to an uppermost end of the sprocket block, by the chain 40.

For a detailed description of the loading, unloading and differential drives 128, 129, 130, reference will be made once more to Figures 5 and 6. A receiver drive shaft 131 is shown at the bottom of each of these figures, with a main drive sprocket 132 thereon for actuation of the loading section of the chain 40 from any suitable power take-off 132a which may form part of a preceding fabrication unit or machine. Adjacent and outside the two loading unit walls 33, 35, the drive shaft 131 carries pulleys 133, 134, which drive similarly mounted pulleys 135, 136 secured to the axles 51a, 71a of the front and back loading sprockets 51, 71; belts 137, 138 being used respectively to interconnect pulleys 133, 135, and 134, 136. The parts 131 to 138 form the loading drive 128. As mentioned above, sprockets or other wheels can be used instead of the pulleys when associated parts are formed accordingly, but it is much preferred to use so-called no-stretch timing belts, as illustrated at 153, in order to minimize out-of-phase rotation of front and back sections of the conveyor.

As further shown in Figure 5, a delivery drive shaft 139 has a main drive sprocket 140 mounted thereon and actuated from a receiving unit or machine, which may operate at a speed different from that of the unit or machine loading the opposite end of the present system. Front and back belt drives 141, 142 connect the shaft 139 with the offset delivery sprockets 59, 79.

In the upper part of the loading casing 31, two pulleys 143, 144 are mounted on the sprocket axles 57a, 77a. These are connected with lower pulleys 145, 146, by belts 147, 148, respectively; the last mentioned pulleys being fast on a shaft 149, forming a terminal part of the unloading drive 129, which part is mounted vertically above the main loading drive shaft 131.

Thus there are formed lower and upper drive elements rotatable at the rates of the loading and unloading means and identified respectively by numbers 131 to 134 and 145 to 149. Between these mutually superposed, loading and unloading drive elements, a differential gear cluster 150 is interposed. It comprises a pair of horizontal, hollow input shafts 151, 152, aligned with one another and journalled respectively to the front and rear walls of the loading and control case 31. Each of these hollow shafts is rotated by a belt 153, 154, driven by one of the mutually superposed drive elements, by means of a system of differential input pulleys 155 to 158. The parts 150 to 158 form the differential drive 130. Otherwise the construction of the differential gear device 150 may be conventional, comprising for instance a pair of bevel end gears 159, 160 opposite one another at the inner ends of the hollow shafts; bevel spider pinions 161, 162; a spider axle 163, 164 for each spider pinion; a spider hub 165 from which the spider axles radiate; an inner output shaft 166, extending through the spider hub 165, through the hollow input shafts 151, 152 and through the front and rear walls 33, 35; and a pin 167, securing the spider hub 165 to the inner shaft 166.

Thus the output shaft 166 is forced by the differential drive 130 to rotate at a differential speed equal to the arithmetic mean $(V_{128}+V_{129})/2$ of the speeds $V_{128}$ and $V_{129}$ of the loading and unloading input drive elements 128, 129. Such differential speed is the proper one for the pulleys located in the middle of the chain 40, between elements 128, 129, on both sides of the carriage, when the sprocket block, as mentioned, shall move at a velocity of $(V_{51}-V_{59})/n$, which is equal to $(V_{128}+V_{129})/n$. Therefore each output shaft 166 has output take-off pulley means 168, 169, secured to outer ends thereof, adjacent and outside the front and rear walls 33, 35; and said pulley means are connected with differential take-off pulleys, axle and sprocket means 170, 171, 172, in front, and with similar means 173, 174, 175, in rear, by belt means 176, 177, at a level between the upper and lower drive elements. The system of differential take-off sprockets 172, 175 forms part of the general sprockets system 51 to 57, 71 to 77, described above.

A single differential drive 130 suffices to feed positive actuation to middle sprockets at both sides of the carriage, by means of a relatively simple interconnecting differential drive means forming part of the sprocket block 41. This block is illustrated in Figures 5 and 13 as comprising a pair of movable loading sprockets 178, 179, positioned at the front and back of block 41, between the top and bottom thereof, which are connected to similarly positioned unloading sprockets 180, 181 by pulleys 182, 183 on their respective axles and belts 184, 185 between such pulleys.

It must now be noted that because of the longitudinal motion of the sprocket block 41, a special motion is required for certain parts of each conveyor tray, whenever such parts travel upwardly or downwardly in the sprocket block. This matter relates more particularly to the track wheels, which as mentioned, run on rigid tracks 117, 118 extending from one end of the machine to the other end, through the sprocket block. No interference with upward or downward motion exists in the loading and unloading casings 31, 32, where the trays and their track wheels can move vertically through unobstructed space. In the sprocket block 41, by contrast, it is necessary to move the track wheels inwardly away from their tracks, incident to moving them around their sprockets; it being impossible to provide space for track wheel motion in purely vertical planes, at all of the various positions where such space would be required because of the traveling of the sprocket block.

The preferred manner in which the necessary motion is obtained is illustrated in Figures 13 to 19. As basically shown in Figure 13, the sprocket block has sprocket-supporting bearing members 200 cantilevering inwardly from its front and rear walls 48, 49, between the stationary, mutually superposed track beams 20, 21, etc. Thus an upper and a lower run of the tray-conveyor system 39, 40 is formed between each pair of track beams.

As further shown in Figures 14, 15, the narrower tracks 118 as well as the wide tracks or trays 117 extend through the sprocket block. It must be noted that no interference is offered by the wide tracks 117, with regard to the vertical travel of the trays, the trays being caused by the traverser sprockets to move between these tracks, but that the lower and narrower tracks 118 interfere with vertical motions of the track wheels 116 running thereon. Therefore guide members 201, 202 are provided, adjacent the movable sprockets, for guiding the track wheels laterally of the narrow tracks on which these wheels run from time to time, and around inner edges of the tracks.

Details of a typical guide member 201 in the loading portion of the sprocket block are best shown in Figures 16, 17. In this portion, as shown, all track wheels 116 approach the sprockets and their bearing members 200 from the underside of such members, while running on the outer edges of broad tracks or stationary trays 117. In order to lift such a track wheel onto the overlying narrow track 118, and simultaneously to move the wheel around the inner edge of that track, there is provided a cam or guide member 201, comprising a lower plate portion 203 obliquely interposed on the curved upward path P of the wheel about the center of sprocket bearing 200, so as to force the rising wheel 116 toward its connector block 112, against the action of its spring 120. Then, adjacent the top of the bearing member 200, there is provided a return guide or cam 204, obliquely interposed on the path P so as to allow the spring 120 to gradually return the rising wheel 116 to its normal, outer position. The cams 203, 204 may be secured to one another and to the bearing by a suitable reenforced web 205.

The wheel-lowering guide member 202 in the unloading section, Figures 18, 19, may have similarly formed but oppositely arranged cam sections 206, 207 combined by web sections 208.

Front and back portions of each tray are lifted and lowered simultaneously and similarly, in the sprocket block, by the parallel sprockets 54, 74 and 67, 87, the action of which can best be seen in Figure 15. Likewise, lateral deflection and return movements are effected simultaneously and similarly at the front and back, by guides 201, 202, as described.

A different motion control for the trays is required and provided in the end casings 31, 32, as mentioned above. Here, it is necessary to guide each tray smoothly up onto each successive overlying track, in the loading casing, and smoothly down away from each overlying track in the unloading casing, without undesirable impacts or jarring between edges or other portions of the tracks and upturned tips 102 of the skeleton trays. Theoretically, as evident from Figure 8, the horizontal fingers may just miss the adjacent track edges, in being guided around them by the cooperating sprockets. Practically, panels or other articles lying on the skeleton trays may tend to slightly flex some of the fingers 101 down, adjacent the free end of such fingers, which ends are remote from the bar 100. A danger of interference between moving and stationary parts may arise from such a condition, mainly if the tiers are advantageously low and compact. The danger, however, is avoided by the cooperating deflector bars and end fingers 105, 110. The bars 110 are interposed in the paths of the flanges on the end fingers 105 so that, as the rising or falling motion of a tray about an end sprocket is being completed, said bars apply a slight vertical deflection to said flanges and end fingers, causing a slight tilting of each tray bar 100 in one angular direction. This in turn causes a vertical deflection of the free ends of fingers 101 on the other side of said bar, in the opposite angular direction. At the moment of such deflection, no guidance is given to the traveling tray by the track wheels 116, which are only completing their travel from one track to another. The deflection described serves as a guiding operation at such a moment. It allows smooth, successful completion of each turn, even in the case of tiers closely packed with conveyor means.

The operation of the entire machine is believed to be clear from the explanations given above; however, it may be briefly restated, in sequence, as follows:

The loading and unloading drives 128, 129 may normally operate at uniform speed and the sprocket block 41 may then be in its middle position, as shown in Figure 3. The series of trays 39 is continuously loaded with partly completed panels from a loading belt L, at 51; the trays then travel upward zigzag courses 52—53 . . . 56—57 and then downwardly to delivery sprockets 58—59—60—61—62 and an unloading belt U; empty trays 39 returning in zigzag courses 63—64 . . . 67—68 to 51, while the panels are unloaded at 70 for further fabrication.

Assuming now a temporary stoppage or slow-down of the preceding fabricating machine and of its panel loading and conveyor driving mechanism: this causes lowered or zero speed at 51 and progressively less lowered speeds at 52, 53, etc., as the sprocket block 41 begins to move toward the left toward and finally into the position of Figure 4. Assuming, on the other hand, a stoppage or slow-down in the subsequent, panels unloading and fabricating machine: this causes an opposite movement of the sprocket block 41, toward the right.

Normally, stoppages or slow-downs of such machines will alternate and the sprocket block will therefore tend to move back and forth about the middle position of Figure 3. Such moving back and forth may continue for a long time. For instance, assuming a total storage capacity of the present machine equal to one hundred twenty traveling trays and a normal production rate sufficient to fill and empty about two panels per second, in the loading and unloading machine; this means that the present unit has a take-up capacity enabling it to compensate up to one minute's complete stoppage of either machine, or proportionally longer periods of differential slow-down. In the mechanized fabrication of electrical panels by modern fabrication machines, stoppage of either machine can be limited to periods such as five to ten seconds. Thus there is no great probability that the sprocket block 41 reaches the ultimate position of Figure 4, or the opposite ultimate position wherein the block comes to a stop at the unloading end of the machine.

Exceptionally, however, such an ultimate position may be approached by the sprocket block 41, at either end of its travel. At and about such times the sprocket block may actuate a suitable system of limit switches (not shown) to de-energize, for a predetermined time, that conveyor drive 128, 129 which has caused the block to reach a limit position, or otherwise to operate suitable control power. Such power may be used at any proper time for returning the carriage to its normal position, if any, after an excursion caused by a difference in loading and unloading speeds.

During any operation of the present machine, some stretching of chains or flexible elements 40 may be encountered. An illustrative case may involve a chain of three hundred feet length and a stretch of two percent of initial length after the first one thousand hours of operation. The total stretch then amounts to six feet, and the effective stretch may be, for example, about three to four inches, if superposed tiers are used as shown. Such a stretch is likely to cause a chain slack in both loading and unloading sections of the machine. It is desirable from time to time to eliminate any such tendency toward formation of a slack and thus to insure among other things continued, proper guiding action of the guide bars 110. For this purpose there is provided a pair of chain-tightener members 210, 211, for the loading and unloading chain sections, respectively, as shown in Figure 5. These members may have the form of frames adjustably secured to the inside of the unloading casing 32 and having mounted therein, respectively, the sprocket system 67, 87, returning the chain to the loading section, and the sprocket systems 61, 81 and 62, 82, returning the chain from the delivery section 59, 79 and 60, 80 to the normal standby system 63, 83, etc. Each chain tighener frame may have a pair of trunnions 212, slidable in slots 213 in the casing walls 34, 36, and may be adjustably fixed in position by suitable bolts 214.

In the preceding description it has been assumed that the storage of panels, in the expandable loading and active storage section of this machine, serves only the combined purposes of mass conveying and mass differential storage, which have been explained. However, it is possible to apply additional treatment to the stored panels; for instance to apply heating, cooling or various other effects to panels which are in transit to or from dip-soldering units or the like, by heating or cooling units or other apparatus, not shown. The terms storage, active storage, conveying, etc., as used herein, are intended to apply whether or not such added treatment is given.

Many other modifications are possible. While only one apparatus according to the invention has been described, it should be understood that the details thereof are not to be construed as limitative of the invention, except insofar as set forth in the following claims.

I claim:

1. A conveyor, comprising: a series of carriers for goods to be conveyed, each carrier being a skeleton tray which in turn comprises rigid support means and a series of flexible strips attached to the rigid support means; flexible conveyor links interconnecting said rigid support means of the series of carriers to form an endless chain of the carriers; at least two stationary, rigid systems of guiding wheels for said chain of carriers, each system of guiding wheels comprising at least two such wheels transversely spaced apart across the chain; means adapting each of said trays to remain in substantially horizontal position at all times while running between and around the several guiding wheels; at least two movable, rigid systems of guiding wheels for said chain of carriers, transversely spaced apart across said chains; wheel support carriage means extending transversely of said chain between the stationary systems, said carriage means having the movable systems of wheels mounted therein and being movable longitudinally between said stationary systems, said chain having at least two sections, each running alternately over wheels of the stationary system and wheels of a movable system; and drive means adapted to rotate wheels of said systems of guiding wheels.

2. A conveyor as described in claim 1 wherein the rigid support means of each skeleton tray comprises a straight elongated bar extending across the chain of carriers, having a terminal support member secured to each end thereof and having the flexible strips secured thereto, between the ends of the bar, said strips extending parallel to said chain.

3. A conveyor as described in claim 2 wherein the support bars of the skeleton trays are oblique to the chain of carriers and parallel to one another, the transversely spaced wheels of each system of guiding wheels being spaced along the chain of carriers by distances corresponding to the obliqueness of the diagonal bars.

4. A conveyor as described in claim 2 wherein each of said terminal support members is a small wheel, the apparatus comprising also rigid track beam means extending between the stationary rigid systems of guiding wheels and adapted to support the small wheels.

5. A conveyor as described in claim 4 wherein each of said small wheels is adapted alternately to move along said track beam means and at an angle thereto.

6. A conveyor as described in claim 5 wherein said track beam means has a plurality of track beam surfaces, one disposed above another, and said small wheels are adapted to move from one such surface to another pursuant to their said movements at an angle to the track beam means.

7. A conveyor as described in claim 6 wherein the small wheels are spring biased, each in one direction relative to the respective carrier.

References Cited in the file of this patent

UNITED STATES PATENTS

| | | |
|---|---|---|
| 1,736,517 | Baker | Nov. 19, 1929 |
| 2,551,080 | Allen et al. | May 1, 1951 |